United States Patent [19]
Gold

[11] Patent Number: 5,549,346
[45] Date of Patent: Aug. 27, 1996

[54] AUTO WINDSHIELD MOLDING WITH IMPROVED CROWN

[76] Inventor: Peter Gold, 389 Peninsula Blvd., Hempstead, N.Y. 11550

[21] Appl. No.: 156,687
[22] Filed: Nov. 24, 1993
[51] Int. Cl.⁶ ........................................................ B60J 10/02
[52] U.S. Cl. ................... 296/93; 296/146.15; 52/204.591
[58] Field of Search ..................................... 296/93, 146.15, 296/201; 52/208, 403, 204.591

[56] References Cited

U.S. PATENT DOCUMENTS

| 1,763,603 | 6/1930 | Donahue | 296/93 |
| 3,045,787 | 7/1962 | Attwood | 296/93 X |
| 4,950,019 | 8/1990 | Gross | 52/208 X |
| 4,986,594 | 1/1991 | Gold et al. | 296/93 X |

FOREIGN PATENT DOCUMENTS

| 3040126 | 5/1982 | Germany | 296/93 |
| 0275015 | 1/1990 | Germany | 296/93 |
| 0183313 | 10/1983 | Japan | 296/93 |
| 0215417 | 9/1988 | Japan | 296/201 |

Primary Examiner—Dennis H. Pedder

[57] ABSTRACT

In a T-shaped auto reveal molding, firmed by a vertical leg depending from a horizontally oriented crown, an improvement in the crown consisting of an inverted semi-circular notch which allows for compensating pivotal movement in the distal edge of the crown to maintain contact of the crown with the auto and thus the weather seal therebetween, and also cooperate with a similar semi-circular shape in the crown undersurface adjacent to the notch to form, at the merger of the semi-circular shapes, a line contact with the auto lengthwise of the molding to maximize the pressure applied to prevent weather elements from undermining the weather seal.

2 Claims, 2 Drawing Sheets

AUTO WINDSHIELD MOLDING WITH IMPROVED CROWN

The present invention relates generally to an improved automobile reveal molding installed about the periphery of the windshield or rear window, wherein the improvement is in the crown of the molding, i.e. the portion thereof which spans the gap between the windshield edge and the edge bounding the windshield opening, which enables the crown to maintain its contact with the underlying surface of the automobile and, thus, preserve the weather-tight seal provided by the molding.

The molding is of the well known type as illustrated and described in my prior U.S. Pat. No. 4,986,594 issued on Jan. 22, 1991. In use, the molding is inserted between the edge of the windshield and the flange which bounds the opening for the windshield. The installation contemplates pressing down on the molding which results in line contact of the crown at its remote edge. Inadvertently, however, due to undulation along the noted line contact, as well as uneven pressure causing descending movement of the molding, there is sometimes caused a counterforce in an opposite direction which tends to lift the molding from its installed position. This often occurs while the sealant is "green" and has not yet cured.

It is generally an object of the present invention to provide a reveal molding overcoming the foregoing and other shortcomings of the prior art. More particularly, it is an object to extrude the molding crown with structural features obviating its inadvertent lifting which detracts from the weather seal.

As will be described in greater detail subsequently, the obviating of the lifting of the molding crown from its contact with the underlying support surface is the result of providing in the extruded molding an upside-down semi-circular notch spaced inwardly of and in the underside of the crown leg which contacts the flange. The semi-circular notch results in a traversing or hinging movement of the molding peripheral edge. Thus, in effect, instead of producing a lifting force, the edge of the crown, which makes contact along the flange merely undergoes an appropriate angular modification to make allowances for any undulations along the line of contact or any excessive installation pressure exerted on the molding at one or more length portions during its installation.

Additionally, and as will be explained in greater detail subsequently, the undersurface of the crown adjacent to the semi-circular notch is similarly of a semi-circular shape so that the adjacent semi-circular shapes merge into a flange-contacting component of a line configuration extending lengthwise of the molding, it being understood that contact established along a line is an optimum manner of contributing to the weather sealing function of the molding.

The description of the invention which follows, together with the accompanying drawings, should not be construed as limiting the invention to the example shown and described, because those skilled in the art to which this invention appertains will be able to devise other forms thereof within the ambit of the appended claims.

Figure 1:
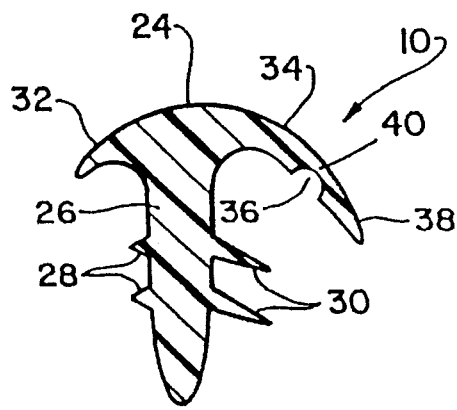
FIG. 1 is a side elevational view showing in cross section the shape of the extruded reveal molding of the present invention.
Figure 2:
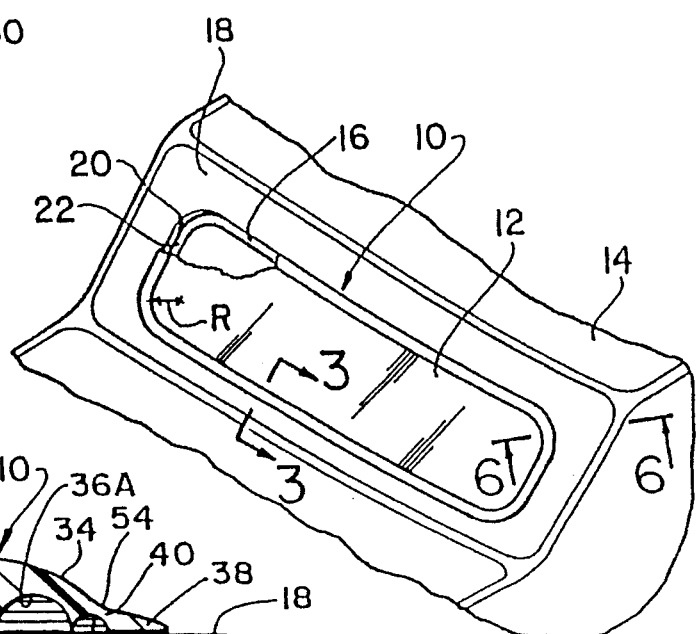
FIG. 2 is a perspective view showing a typical automobile installation of the molding.
Figure 7:
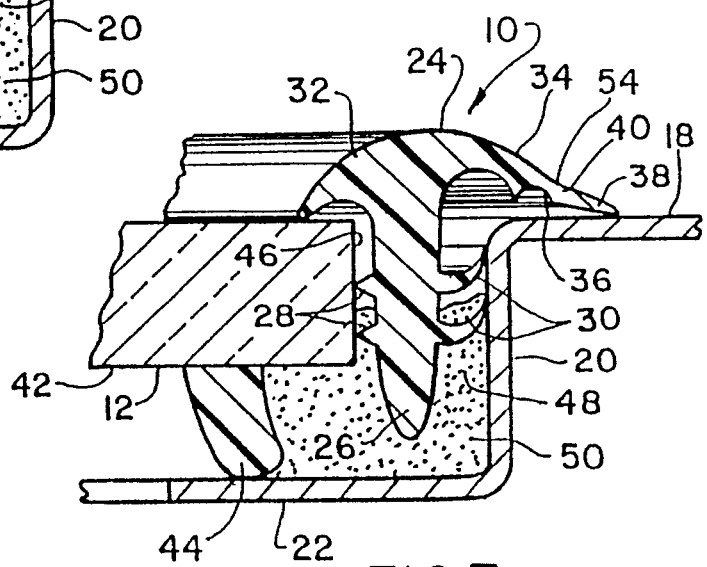
FIG. 7 is a cross sectional view of the molding of the present invention for comparison with the prior art molding as shown in FIG. 6.

In FIG. 1 there is shown a detailed cross sectional view of the within inventive reveal molding, generally designated 10, best illustrating its profile as an extruded article of manufacture. Molding 10 is extruded of an appropriate rubber or elastomeric material of a type usually used about the perimeter of a window 12 on a vehicle 14 as seen in FIG. 2 and, when thusly installed, effectively serving as a weather seal. Like most prior art moldings of this type, molding 10 is also designed to provide an aesthetically pleasing finish or appearance to the window in that it covers the gap 16 between the windshield 12 and the edge 18 which bounds the opening in the auto or vehicle 14 which receives the windshield or glass panel 12. More particularly, the gap 16 is defined by a perpendicular wall 20 and a flange 22, as best seen in FIGS. 3 and 7.

Molding 10 has a crown section 24 and a depending leg 26. Leg 26 is extruded with a pair of lateral projections 28 on one side and a pair of projections 30 on the other side, which center the leg 26 between the glass edge 46 and wall 20. As best seen in FIG. 1, crown section 24 has a left hand overhang or section 32 and a right hand overhang or section 34. On the underside of section 34, and to be particularly noted, is an inverted semi-circular notch 36 which delineates a flap 38, which is readily movable about a flexure line 40 which results from the diminished cross section at location 40, the significance of which will soon be apparent.

Figure 3:
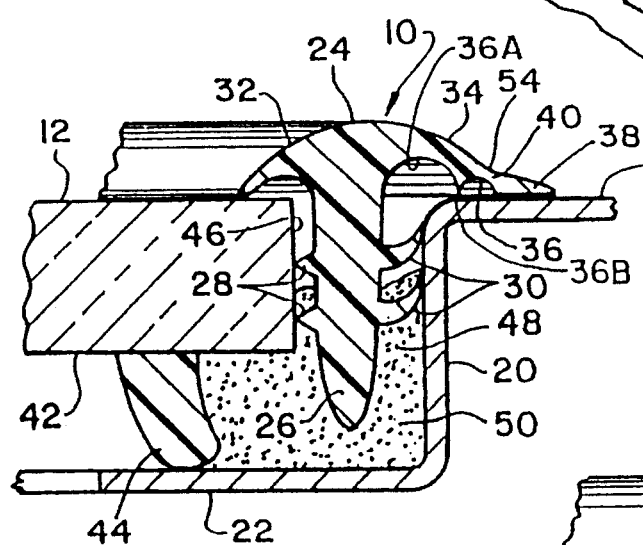
FIG. 3 is a cross sectional view as taken along line 3—3 of FIG. 2.

Also to be noted is that the curvature of the undersurface of the crown immediately adjacent the notch 36, denoted 36A in FIG. 3, is similarly of a semi-circular shape, so that the adjacent semi-circular shapes 36 and 36A merge at the location 36B in what will be understood to be a line configuration extending lengthwise of the molding 10, the significance of which will also soon be apparent.

On the inner face 42 of glass 12, a previously adhesively attached cushioning and so-called dam member 44 is provided to seat on flange 22 when glass 22 is mounted within opening 16. Between edge 46 of glass 12 and wall 20 of opening 16, there exists a cavity 48 which, in practice, is partially filled with commercially available sealant or adhesive 50 of a well known type which cures from an initial paste into a hard substance which is effective in retaining the molding in its installed condition within the gap 16. Preparatory to final assembly, leg 16 of molding 10 is pressed into the uncured adhesive 50 until crown sections 32 and 34 come into contact on respective underlying surfaces of glass 12 and auto surface or wall lateral extension 18. Projections 30 come to bear against wall 20 which causes opposed projections 28 to bear on glass edge 46. One or both of each of projections 28 and 30 thus becomes adhesively engaged by adhesive 50 to retain the reveal molding 10 in place.

Figure 4:
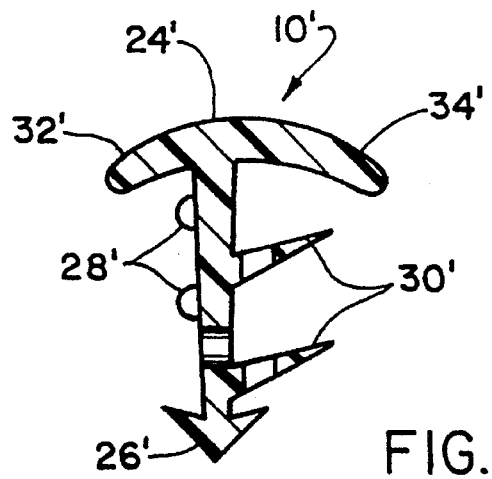
FIG. 4 is a prior art reveal molding for comparison with the inventive molding as shown in FIG. 1 which best demonstrates the structural differences therebetween.
Figure 5:
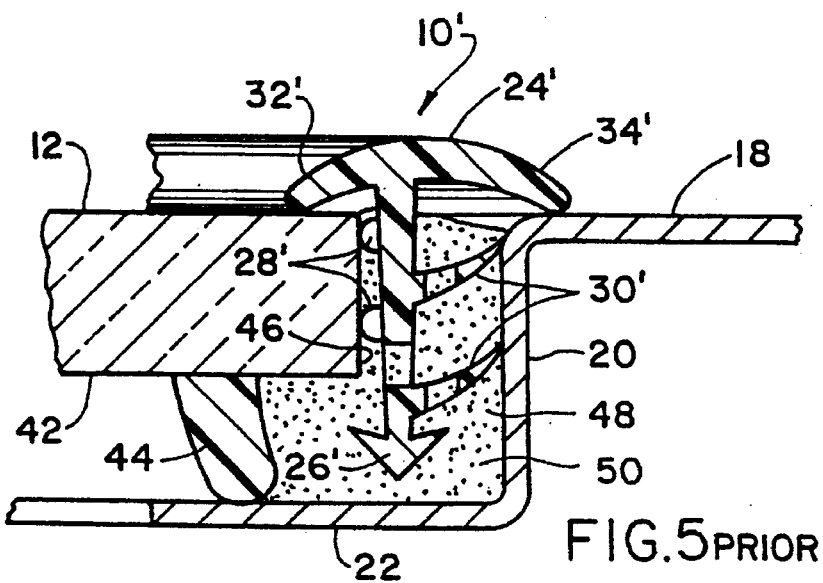
FIG. 5 is a cross sectional view of the prior art molding for comparison with the similar view of the within inventive molding as shown in FIG. 3.

In the prior art, as demonstrated by FIGS. 4 and 5, the molding 10' is likewise installed in much the same manner as the within inventive molding 10. That is, the extruded elastomeric molding is installed about the window 12 in the vehicle 14 to likewise form an attractive weather seal between the edge bounding the opening 16 and the edge 46 of glass 12.

Figure 6:
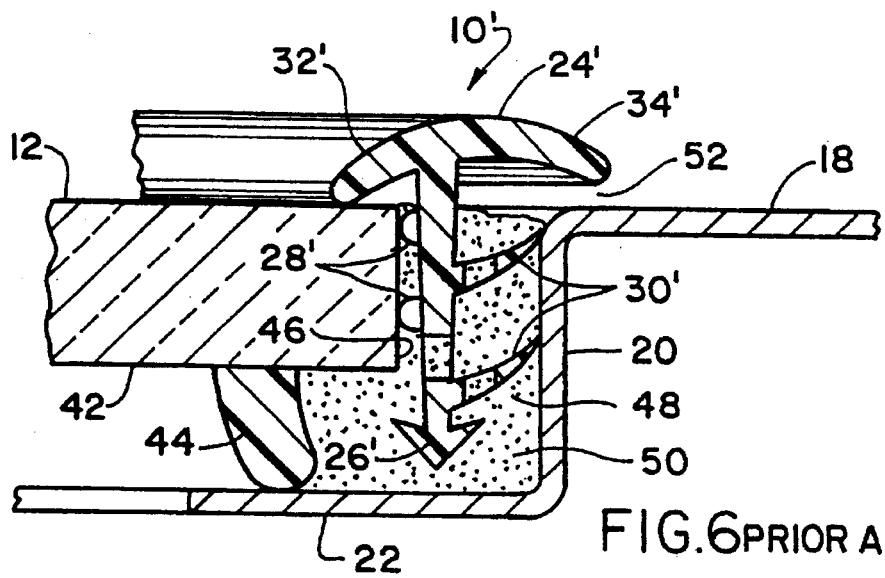
FIG. 6 is a further cross sectional view of the prior art molding as taken along line 6—6 of FIG. 2.

Molding 10' also has a crown section 24' and a dependent leg 26' which supports projections 28' and 30'. As best seen in FIG. 4, crown section 24' has a left hand overhang or section 32' and a right hand overhang or section 34'. When molding 10' is installed in place, which contemplates it being pressed into the adhesive 50 within gap 48, the remote edges of sections 32' and 34', assuming an installation under ideal conditions, should form a tight seal with the respective underlying surfaces of glass 12 and auto panel 18, as shown in FIG. 5. However, during curing of the adhesive 50, it has been noted, and it is a recognition which underlines the present invention, that there is a tendency for "spring-back" in crown 24' and/or seal 44 to sometimes cause a resultant lifting of section 34' as shown in FIG. 6 This occurrence is particularly more prevalent when molding 10' is bent around a corner radius R (see FIG. 2). In this situation, crown section 32' tends to be under compression while section 34' is under tension, and since stress is developed in crown section 24' proportional to the size of radius R, the smaller radius curves at the corners produce lifting tendencies which are severe. As best shown in FIG. 6, crown 24' tends to tilt towards glass 12 causing the distal section 34' to lift away from the panel 18 thereby forming a gap 52 thereunder which detracts from the weather-tight seal.

In FIG. 3, the within inventive molding 10 is shown installed under similarly ideal conditions wherein the remote edges of section 32 and 34 initially make contact with, and remain in contact with, the respective underlying surfaces of glass 12 and auto panel or lateral extension 18. In FIG. 7 the molding 10 is shown installed under less than ideal conditions due to "spring-back" and/or a corner radius situation, either one of which, as previously explained, will cause crown section 24 to tilt towards glass 12 and lift away from the auto panel 18. In contrast to what occurs in the prior art, however, the weather-tight seal is preserved because flap 38 undergoes a clockwise pivotal traverse about pivot 40, thereby maintaining the distal edge 38 of crown section 34 in contact with panel 18. Comparing FIG. 3 with FIG. 7, pivotal movement in the crown flap 38 about the inverted semi-circular notch 36 thus obviates, as best shown in FIG. 7, the gap 52 which often occurs in a prior art reveal molding 10' which lacks an extruded notch 36. As viewed in facing relation to the glass 12 functioning either as a front windshield or rear window, the flexure line 40 manifests itself as a stylish contouring line 54 in the molding 10, which does not exist in the prior art reveal moldings.

In the preceding description reference has been made to "ideal" and "less than ideal" installation conditions of the molding 10. By "ideal" is meant that the installer presses the molding 10 into the gap 16 and thus the dependent leg 26 thereof into the sealant 50 with just the right amount of pressure to ease the distal opposite ends of the crown portions 32 and 34 into contact with the glass 12 and panel 18 respectively. Frequently, however, an excessive pressure is used and a corresponding "less than ideal" installation results in which crown overhang 34 would ordinarily flex and produce a force urgency tending to lift the distal end of leg 25 from its projected position into the sealant 50. As a result of the flexuring or degree of movement permitted in the flap 38 about the line 40 of notch 36, flap 38 merely flattens out along panel or lateral extension 18, as best shown in FIG. 3, rather than assuming a configuration that would urge the molding 10 in an ascending or lifting direction of movement, to which the molding 10 is particularly vulnerable until the sealant 50 cures.

Of equal significance in the frequently occurring installations depicted in FIG. 3, the semi-circular curvature 36A in the underside surface of crown portion or overhang 34 adjacent the semi-circular notch 36 forms at the previously noted merger location 36B a line of contact coincident with the location 36B which is optimum for applying pressure against the wall lateral extension 18 and thus in preventing rain, snow or other elements of weather from movement inwardly of the windshield 12 and undermining the weather seal function of the molding 10.

What is claimed is:

1. Improvements in an automobile windshield molding for insertion between adjacent positioned edges of a windshield and a vertical wall having a lateral extension bounding an opening for receiving in projected relation therein said windshield, and of a type having a depending leg and a crown connected in perpendicular relation at an upper end of said depending leg such that said crown serves as a closure in spanning relation across a gap between an edge of said windshield and said vertical wall with said crown in contact with said adjacent positioned edges, the improvements to said molding comprising a semi-circular notch in an undersurface of said crown extending in overlying relation to said wall lateral extension when said molding is installed as said closure, and a crown portion having a peripheral edge outwardly of said semi-circular notch for flexing through an operative movement subtending an acute angle of rotation in relation to said semi-circular notch to present said peripheral edge in facing relation to said wall lateral extension upon installation, whereby a descending movement of said molding during placement of said molding in said gap establishes a weather-sealing contact between said crown portion peripheral edge and said wall lateral extension.

2. A molding with an improved crown as claimed in claim 1 wherein said crown undersurface includes a portion in adjacent position to said semi-circular notch of similar semi-circular shape whereby the merger of said adjacent semi-circular shapes defines a wall lateral extension contacting component of a line configuration extending lengthwise of said molding, whereby a contact established with said wall lateral extension thereby contributes to enhancing the weather sealing function of said molding.

\* \* \* \* \*